Feb. 12, 1957     J. C. TREMBLAY     2,781,201
CONVERTIBLE CART

Filed Feb. 3, 1954                                    5 Sheets-Sheet 1

Joseph C. Tremblay
INVENTOR.

BY *Clarence A. O'Brien*
*and Harvey B. Jackson*
Attorneys

Feb. 12, 1957   J. C. TREMBLAY   2,781,201
CONVERTIBLE CART
Filed Feb. 3, 1954   5 Sheets-Sheet 2

Joseph C. Tremblay
INVENTOR.

Feb. 12, 1957 J. C. TREMBLAY 2,781,201
CONVERTIBLE CART
Filed Feb. 3, 1954 5 Sheets-Sheet 3
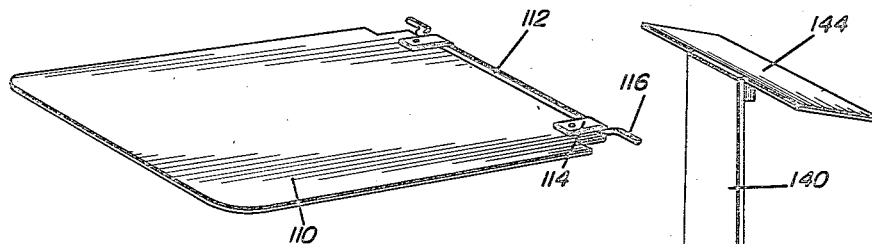
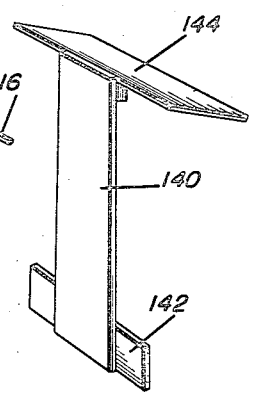
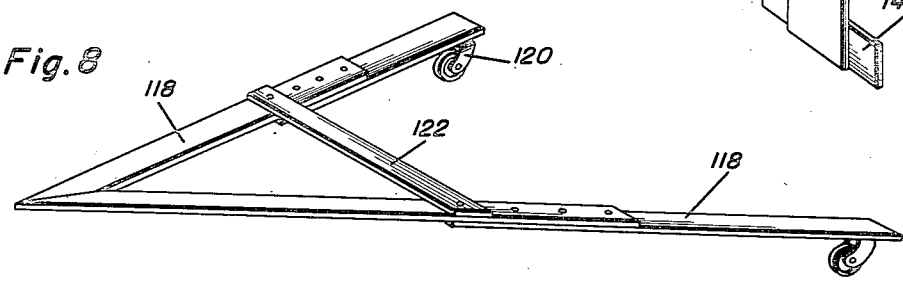
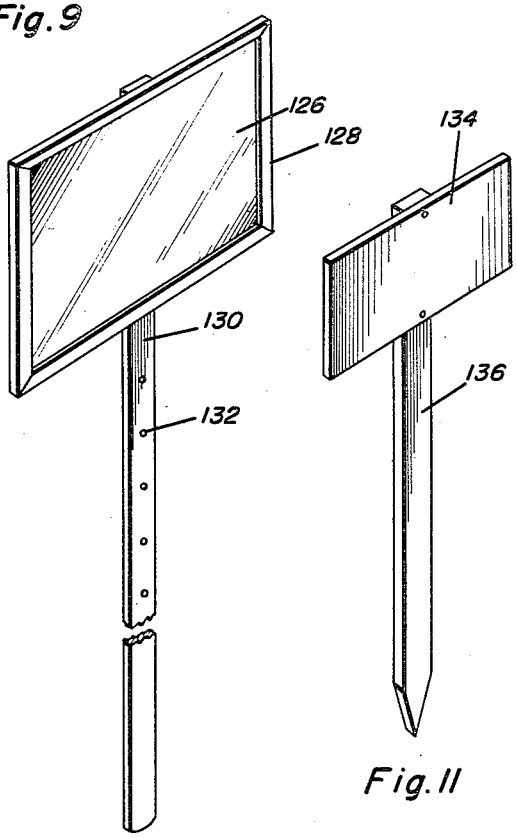
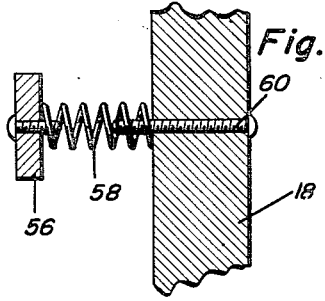
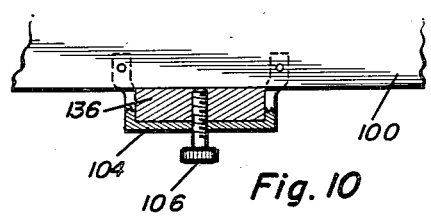
Joseph C. Tremblay
INVENTOR.

Feb. 12, 1957  J. C. TREMBLAY  2,781,201
CONVERTIBLE CART
Filed Feb. 3, 1954  5 Sheets-Sheet 4
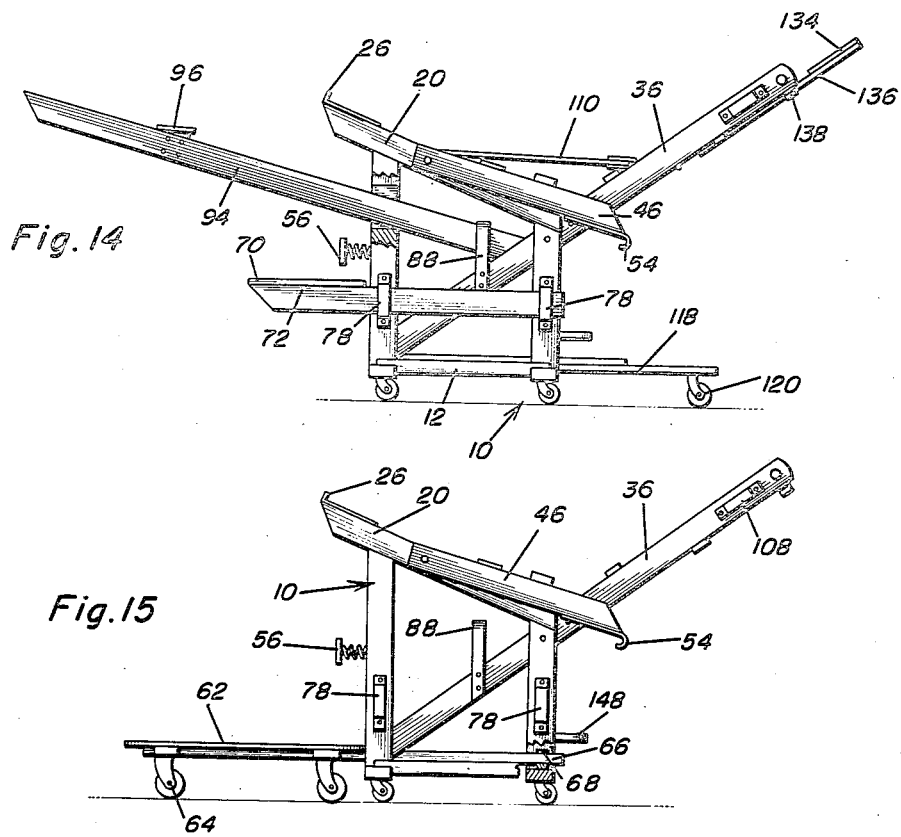
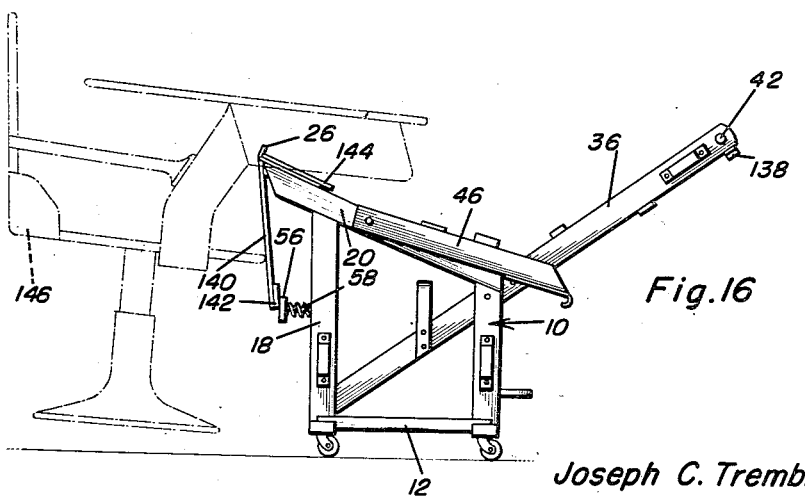
Joseph C. Tremblay
INVENTOR.
BY Clarence A. O'Brien
and Harvey B. Jacobson
Attorneys Feb. 12, 1957  J. C. TREMBLAY  2,781,201
CONVERTIBLE CART
Filed Feb. 3, 1954  5 Sheets-Sheet 5
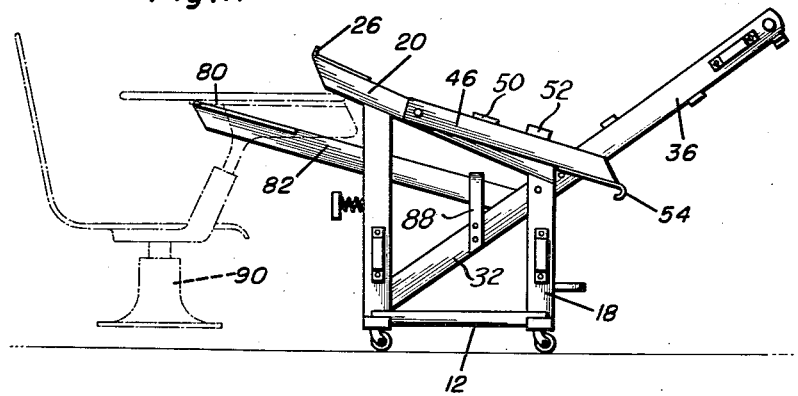
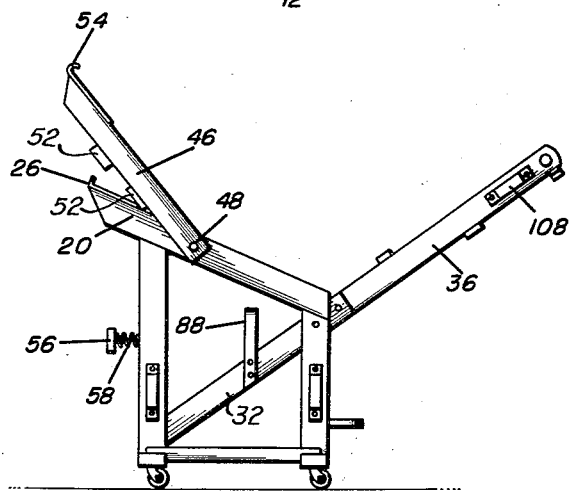
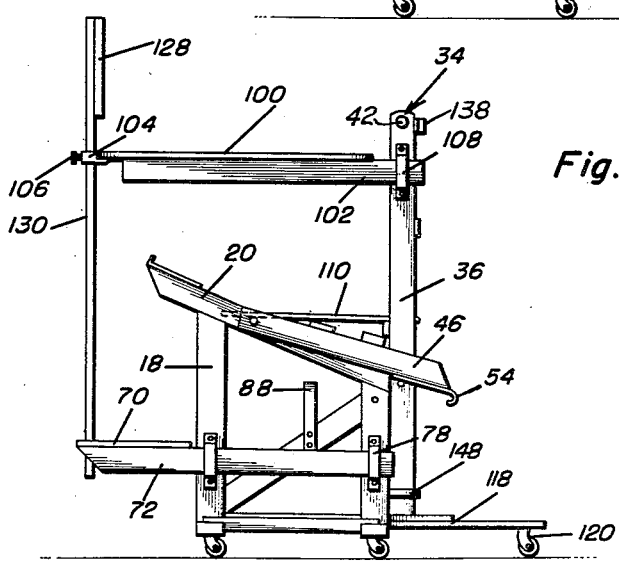
Joseph C. Tremblay
INVENTOR.

2,781,201
CONVERTIBLE CART
Joseph C. Tremblay, Sault Ste. Marie, Mich.
Application February 3, 1954, Serial No. 407,943
10 Claims. (Cl. 280—30)

This invention relates to a convertible cart and more specifically provides a cart having a plurality of attachments, thereby facilitating the use of the cart for various purposes.

An object of this invention is to provide a convertible cart which is simple in construction, easy to operate, versatile in utility, well adapted for its various purposes and relatively inexpensive to manufacture.

Another object of this invention is to provide a convertible cart which may be utilized as a desk or a cart for transporting articles such as desks, chairs or tables, as may become necessary.

A further object of this invention is to provide a convertible cart which may be utilized for transporting articles or as a straight back or reclining chair and which may also be utilized as a writing desk or the like.

Still another important object of this invention is to provide a convertible cart having a plurality of wheels, thereby making the device easily mobile for transporting heavy articles, such as tables or the like, to a desired position.

A still further object of this invention is to provide a convertible cart constructed with a basic frame member with a pair of article carrying arms and a pivotal handle which may be converted by selective attachment of various attachments, thereby converting the cart into a chair, a writing desk, a sick chair for reclining, and a mirrored desk for facilitating personal grooming.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a perspective view of an attachment for moving small desks or the like;

Figure 7 is a perspective view of the detachable seat used when the device is employed as a chair or desk;

Figure 8 is a perspective view of an extension secured to the rear portion of the frame to prevent tipping backward when the frame is used as a reclining sick chair;

Figure 9 is a perspective view of the mirror utilized on the frame when the device is used as a desk or chair;

Figure 10 is a detail section showing the adjustment means for the mirror of Figure 9;

Figure 11 is a perspective view showing a head rest utilized when the device is employed as a sick chair;

Figure 12 is a perspective view of the attachment for lifting desks wherein the desks are retained in upright position;

Figure 13 is a detail section showing the resilient bumper or abutment for retaining desks in a vertical position;

Figure 14 is a side elevational view with portions thereof in section showing the device of the present invention utilized as a reclining sick chair;

Figure 15 is a side elevational view showing the device of the present invention utilized with the platform in position for carrying heavy loads;

Figure 16 is a side elevational view showing the basic frame unit of the present invention utilized for carrying large desks wherein the desks are retained in vertical position;

Figure 17 is a side elevational view showing the device in use for carrying smaller desks in upright position;

Figure 18 is a side elevational view showing the cart of this invention having the second pair of arms in operating position; and Figure 19 is a side elevational view showing the device utilized as a writing desk with the mirror positioned in front of the chair or desk, thereby permitting the occupant of the desk to view himself.

Figures 1, 2:
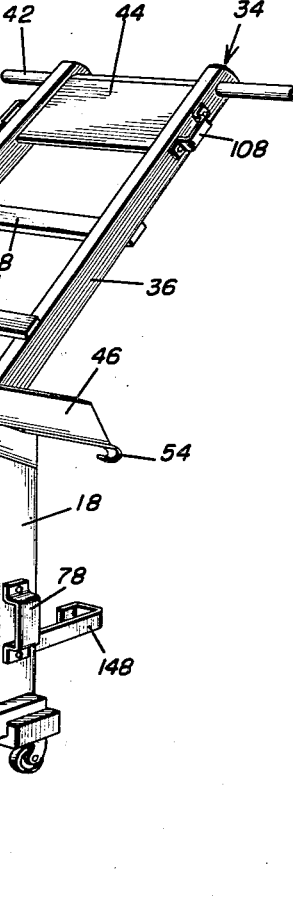
Figure 1 is a perspective view showing the basic frame of the convertible cart of the present invention.
Figure 2 is a perspective view of the platform attachable to the basic frame for use in heavy hauling.

Referring now specifically to the drawings, it will be seen that the numeral 10 generally designates the convertible cart of this invention and, as shown in Figure 1, the numeral 10 indicates the basic unit or basic frame to which the various attachments are secured wherein the cart 10 may be utilized for various different purposes. The convertible cart 10 includes a bottom frame 12 having connecting cross pieces 14 forming a polygonal bottom member with a plurality of caster wheels 16 for supporting the bottom frame 12 in spaced relation to a supporting surface. At each corner of the bottom frame 12 is positioned an upright member 18 being connected together at their upper ends by a pair of arms 20. The upper ends of the upstanding members 18 are inclined forwardly and the rear upstanding members 18 are shorter than the forward upstanding members 18 thereby positioning the first pair of arms 20 in an inclined and forwardly extending position. The arms 20 extend forwardly of the upstanding members 18 and terminate with an inwardly inclined end portion 22, and the upper surface of the arms 20 is provided with a plate 24 having a right angular end portion 26 forming a hook member for engaging articles to be transported in a manner described hereinafter.

Crossed brace members 28 are positioned between the front upstanding members 18 and a cross member 30 extends between the upstanding members 18 substantially at their central portions. A pair of diagonal braces 32 extend from the lower forward end of the frame 12 to the rear portion of the arms 20 and a handle, generally designated by the numeral 34, including a pair of side members 36 secured together by a plurality of interconnecting members 38 is hingedly secured to the braces 32 substantially at the intersection of the side members 36 and the arms 20. The lower ends of the side members 36 of the handle 34 are provided with an interconnecting cross member 40 which engages under the braces 32 for limiting the downward pivotal movement of the handle 34. The upper ends of the side members 36 are provided with an extending rod 42 which projects on each side of the handle 34 thereby forming a gripping member for the handle 34. A wide board 44 is affixed to the upper end of the side members 36 for forming a back rest when the device is utilized as a chair or desk.

Secured to the first pair of arms 20 is a second pair of arms 46 being pivotally mounted on the first pair of arms by a transverse pivot rod 48 and the side arms of the second pair of arms 46 are interconnected by a pair of cross members 50 and 52 wherein the member 52 retains the second pair of arms 46 in inoperative position and the cross member 50 engages the upper surface of the arms 20 for retaining the second pair of arms 46 in vertically spaced relation to the first pair of arms 20, substantially as shown in Figure 18. Each free end of the second pair of arms 46 is provided with a hook member 54 for engaging articles similar to the action of the hook member 26 on the first pair of arms 20. The particular shape of the hook member 54 may be altered to meet the specific needs.

A transverse abutment bar 56 is resiliently secured centrally of the forward upstanding members 18 by suitable coil springs 58 and fastening means 60 that are attached to the coil springs 58, thereby retaining the abutment bar 56 in position. The abutment bar 56 is used to engage articles supported by the hook members 26 for retaining such articles in the desired vertical position.

Now referring specifically to Figure 2, it will be seen that a platform 62 is provided with a plurality of caster wheels 64 on the undersurface thereof, and a pair of rearwardly projecting arms 66 for positioning on the upper surface of the forward portion of the bottom frame 12 between the diagonal braces 32 for supporting a heavy load, substantially as shown in Figure 15. The rearmost ends of the rearwardly extending arms 66 are positioned between a U-shaped member 68 and the upper surface of the rear portion of the frame member 12 when in assembled position on the convertible cart 10. This platform 62 permits the transportation and moving of relatively heavy articles with the cart of the present invention, wherein the handle 34 is in its operative position in parallel relation to the diagonal braces 32.

Figure 3:
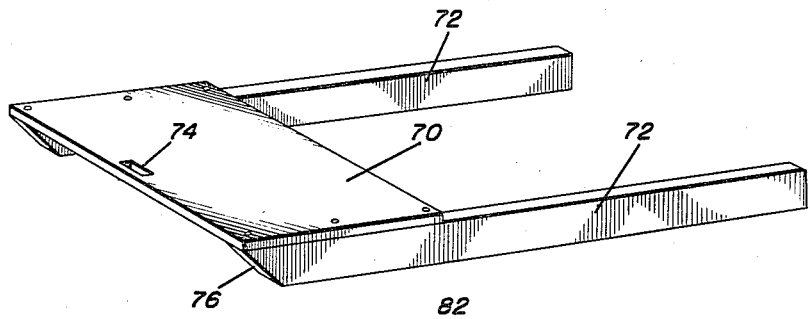
Figure 3 is a perspective view of the foot rest attachment for positioning on the basic frame.

Referring now specifically to Figure 3, it will be seen that the numeral 70 generally indicates a foot rest in the nature of a shelf having a pair of side arms 72 and an aperture 74 adjacent the forward edge thereof. The forward ends of the side arms 72 are inwardly inclined, as indicated by the numeral 76. The side arms 72 of the foot rest 70 are adapted to be positioned in loop members 78 secured on the sides of the upstanding members 18 in horizontal alignment with and adjacent the bottom frame 12, wherein the foot rest 70 is supported in substantially horizontal position adjacent the bottom frame 12 of the convertible cart 10.

Figure 4:
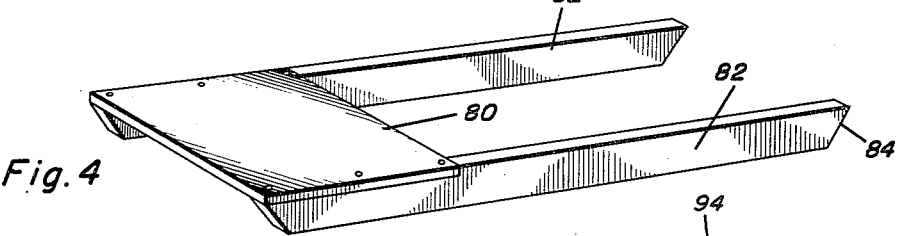

As specifically illustrated in Figure 4, a small desk supporting member 80 having side arms 82 with the rear ends thereof inwardly tapered, as indicated by the numeral 84, is provided for attachment to the cart 10. The side rails 82 of the small desk support 80 are disposed closer together than the side arms 72 of the foot rest 70 and are adapted to be positioned in grooves formed by upstanding members 86 on the cross member 30 in spaced relation to the upstanding members 18. The inclined ends of the side rails 82, as indicated by the numeral 84 are adapted to engage the upper surface of the diagonal braces 32 and engage under a right angular bracket 88 that hooks over the upper surface of the side arms 82 adjacent the rear ends thereof for securing the small desk supporting member 80 in assembled relationship, substantially as shown in Figure 17 for raising and transporting a small desk, indicated by the numeral 90.

Figure 5:
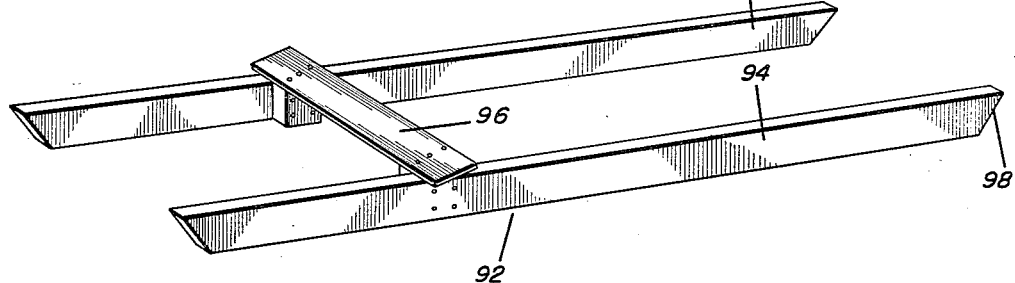
Figure 5 is a perspective view of the attachment used as a leg rest when the basic frame is converted into a reclining chair.

Referring now specifically to Figure 5, it will be seen that the numeral 92 generally designates a leg rest of the present invention having a pair of elongated side members 94 with a cross piece 96 adjacent the forward end thereof and having the rear ends of the side arms 94 inclined, as indicated by the numeral 98, substantially as the ends 84 of the side arms 82 on the small desk support 80. It will be seen in Figure 14 that the leg rest 92 is positioned substantially in the same manner as the small desk support 80 and is used when the device is utilized as a reclining sick chair.

Figure 6:
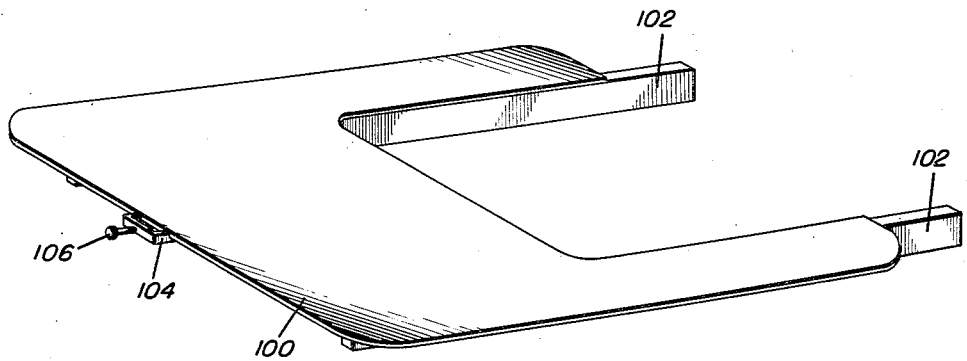
Figure 6 is a perspective view of the attachment converting the basic frame into a writing desk.

As specifically illustrated in Figure 6, a desk top 100 has rearwardly extending arms 102 and a U-shaped bracket 104 with a thumbscrew 106 positioned therein for a purpose described hereinafter. As shown in Figure 19, the desk top 100 is adapted to have the rearwardly extending arms 102 slidably received in U-shaped brackets or loops 108 on the outer sides of the side members of the handle 34 adjacent the upper end thereof, thereby forming a desk top for writing or the like.

As shown in Figure 7, a removable seat 110 has a transversely extending bar 112 at its rear portion and secured thereto by suitable strap members 114 wherein the bar 112 is provided with angulated end members 116 for engagement behind the side portions 36 of the handle 34. The forward portion of the seat 110 rests upon the upper surface of the transversely extending pivot rod 44 which extends between the arms 20 and pivots the second pair of arms 46 to the arms 20.

As specifically illustrated in Figure 8, it will be seen that a triangular extension 118 is provided with caster wheels 120 and a cross brace 122 for strengthening the extension 118. The extension 118 is positioned under the U-shaped strap 68 and extends rearwardly therefrom substantially as illustrated in Figure 19. Also, in Figure 14, it will be seen that the extension 118 is utilized when the device is utilized as a reclining sick chair, and the apex end of the triangular extension 118 is positioned under a loop 124 on the upper surface of the bottom frame 12.

As specifically illustrated in Figure 9, a mirror 126 having a frame 128 and a vertically extending mounting arm 130 with a plurality of apertures 132 therein is positioned for attachment to the desk top 100 by positioning the rod 130 in the U-shaped bracket 104 and engaging the thumbscrew 106 with selected apertures 132. The lower end of the rod 130 is adapted to engage the aperture 74 in the foot rest 70, thereby steadying the mirror 126 in position, substantially as illustrated in Figure 19.

Figure 11 illustrates a head rest 134 having a depending rod 136 for positioning in a loop 138 on the rear surface of the upper end of the handle member 34 wherein the head rest 134 is utilized for holding the head when the cart 10 is utilized as a reclining chair, substantially as illustrated in Figure 14.

As shown in Figure 12, an adapter 140 of substantially right angular configuration has a transverse lower abutment bar 142 for engagement with the abutment bar 56 on the upstanding members 18 and an upper member 144 for engagement with the upper surface of the arms 20 thereby providing a support for a desk 146 in a vertical position, substantially as illustrated in Figure 16 wherein desk 146 may be transported without removing all of the material therein.

As illustrated in Figures 1 and 19, a pair of right angular brackets 148 are secured to the rear upstanding members 18 and project rearwardly therefrom for engaging the undersurface of the side members 36 of the handle 34 for retaining the side members 36 in vertical position when the cart 10 is utilized as a writing desk.

The operation of the device will be readily understood. As illustrated in Figures 1 and 14–19, the convertible cart 10 may be utilized as the basic frame illustrated in Figure 1, or as illustrated in Figure 14, the foot rest 74, the leg rest 96, the seat 110 and the head rest 134 may be utilized for converting the cart 10 into a reclining sick chair or the like. In Figure 15, the basic unit 10 is equipped with the platform 62 for carrying heavy loads with the cart 10. As illustrated in Figure 16, the adapter 140 is positioned over the ends of the first pair of arms 20 for engaging a large desk 146 and retaining the desk 146 in substantially vertical or normal position, thereby eliminating the necessity of removing ink or other materials from the desk. As illustrated in Figure 17, the small desk support is utilized wherein smaller desks 90 may be transported in an easy and convenient position. Figure 18 illustrates the use of the second pair of arms 46 and this device may be utilized for pivoting and carrying a large device, such as a table or the like. When it is desired to utilize the device as a writing desk, the handle 34 is pivoted upwardly to a vertical position until the side arms 36 engage the brackets 148. The desk top 100 is positioned with the members 102 engaging the loops 108, and the seat 110 and foot rest 70 positioned in the usual manner. The mirror 126 with the depending arm 130 is positioned in the bracket 104 with the lower end thereof positioned in the aperture 74 in the foot rest 70 and when the mirror 126 is in adjusted position, the thumbscrew 106 is screwed in, thereby clamping the mirror in adjusted position for viewing by the occupant of the writing desk, as illustrated in Figure 19. In Figures 19 and 14, the rearward extension 118 is utilized to prevent accidental tipping backwards of the cart 10. Obviously, the device may be constructed of readily obtainable materials, such as wood or the like, and well known methods may be utilized in securing the various elements to each other, and the particular size of each of the elements is determined by the particular use for which the device is intended. In practical use, the device has been utilized for carrying school desks, tables, or the like, and further has been utilized as a writing desk or a reclining sick chair when necessary. Obviously, the device is ruggedly and simply constructed, thereby enhancing the economic feasibility and the ease of operation and conversion of the device.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A convertible cart comprising a main frame having a plurality of upstanding and cross members, a first pair of arms secured to and projecting forwardly from the upper end of said frame, a plurality of wheels secured to the bottom of said frame, a handle pivotally mounted to said frame, and means on said frame for detachably receiving a plurality of attachments whereby the cart may be used for various purposes, said first arms being inclined upwardly and outwardly, and a second pair of arms pivotally mounted on said first arms, said second pair of arms adapted to lift and carry tables, said frame being provided with a transverse resiliently mounted abutment member for retaining transported articles in vertical position.

2. A convertible cart comprising a wheeled frame having a pair of forward and rear upstanding members with the forward pair of upstanding members terminating above the upper ends of the rear pair of upstanding members, brace means interconnecting the upstanding members and forming a rigid frame, a first pair of arms interconnecting the upper ends of respective forward and rear upstanding members, said arms extending forwardly from the frame and being disposed in upwardly inclined relation for rigidly interconnecting the uneven upper ends of the upstanding members, handle means pivotally attached to said frame, means for limiting the pivotal movement of the handle means, and a second pair of arms terminally pivotally attached to the first pair of arms adjacent the center thereof, said second pair of arms being of a length to project beyond the forward ends of the first pair of arms, a transverse member interconnecting the second pair of arms for engagement with the upper edges of the first pair of arms thereby supporting the second pair of arms in upwardly diverging relation to the first pair of arms, and a wheeled platform attached to the front of said frame for transporting heavy loads.

3. A convertible cart comprising a wheeled frame having a pair of forward and rear upstanding members with the forward pair of upstanding members terminating above the upper ends of the rear pair of upstanding members, brace means interconnecting the upstanding members and forming a rigid frame, a first pair of arms interconnecting the upper ends of respective forward and rear upstanding members, said arms extending forwardly from the frame and being disposed in upwardly inclined relation for rigidly interconnecting the uneven upper ends of the upstanding members, handle means pivotally attached to said frame, means for limiting the pivotal movement of the handle means, and a second pair of arms terminally pivotally attached to the first pair of arms adjacent the center thereof, said second pair of arms being of a length to project beyond the forward ends of the first pair of arms, a transverse member interconnecting the second pair of arms for engagement with the upper edges of the first pair of arms thereby supporting the second pair of arms in upwardly diverging relation to the first pair of arms, and a head rest, seat, foot rest and leg rest attached to the frame thereby forming a reclining chair, said head rest being detachably secured to the upper end of the handle means, said seat being detachably positioned between said first arms and handle means, said foot rest including a shelf with projecting side members for detachable engagement with a pair of loop members adjacent the bottom of said frame, and said leg rest including a cross bar substantially parallel to said seat.

4. A convertible cart comprising a wheeled frame having a pair of forward and rear upstanding members with the forward pair of upstanding members terminating above the upper ends of the rear pair of upstanding members, brace means interconnecting the upstanding members and forming a rigid frame, a first pair of arms interconnecting the upper ends of respective forward and rear upstanding members, said arms extending forwardly from the frame and being disposed in upwardly inclined relation for rigidly interconnecting the uneven upper ends of the upstanding members, handle means pivotally attached to said frame, means for limiting the pivotal movement of the handle means, and a second pair of arms terminally pivotally attached to the first pair of arms adjacent the center thereof, said second pair of arms being of a length to project beyond the forward ends of the first pair of arms, a transverse member interconnecting the second pair of arms for engagement with the upper edges of the first pair of arms thereby supporting the second pair of arms in upwardly diverging relation to the first pair of arms, said frame being provided with a detachable shelf member extending forwardly of the frame, said shelf being narrower than said frame for engaging small desks.

5. A convertible cart comprising a wheeled frame having a pair of forward and rear upstanding members with the forward pair of upstanding members terminating above the upper ends of the rear pair of upstanding members, brace means interconnecting the upstanding members and forming a rigid frame, a first pair of arms interconnecting the upper ends of respective forward and rear upstanding members, said arms extending forwardly from the frame and being disposed in upwardly inclined relation for rigidly interconnecting the uneven upper ends of the upstanding members, handle means pivotally attached to said frame, means for limiting the pivotal movement of the handle means, and a second pair of arms terminally pivotally attached to the first pair of arms adjacent the center thereof, said second pair of arms being of a length to project beyond the forward ends of the first pair of arms, a transverse member interconnecting the second pair of arms for engagement with the upper edges of the first pair of arms thereby supporting the second pair of arms in upwardly diverging relation to the first pair of arms, said handle means adapted to be pivoted to a vertical position, a horizontal seat positioned between said handle means and first arms, a foot rest projecting forwardly of said frame adjacent the bottom thereof, a horizontal desk top extending from said handle means in parallel vertical spaced relation to said seat, and a mirror having a mounting rod adjustably secured to the outer end of said desk top and extending downwardly through an aperture in the foot rest.

6. A convertible cart comprising a wheeled frame having a pair of forward and rear upstanding members with the forward pair of upstanding members terminating above the upper ends of the rear pair of upstanding members, brace means interconnecting the upstanding members and forming a rigid frame, a first pair of arms interconnecting the upper ends of respective forward and rear upstanding members, said arms extending forwardly from the frame and being disposed in upwardly inclined relation for rigidly interconnecting the uneven upper ends of the upstanding members, handle means pivotally attached to said frame, means for limiting the pivotal movement of the handle means, and a second pair of arms terminally pivotally attached to the first pair of arms adjacent the center thereof, said second pair of arms being of a length to project beyond the forward ends of the first pair of arms, a transverse member interconnecting the second pair of arms for engagement with the upper edges of the first pair of arms thereby supporting the second pair of arms in upwardly diverging relation to the first pair of arms, said frame being provided with a wheeled extension detachably secured to the rear of the frame for stabilizing said frame when utilized as a reclining sick chair.

7. A convertible cart comprising a wheeled frame having a plurality of upstanding members, a plurality of cross members rigidly secured to the upstanding members thereby forming a rigid frame, a first pair of forwardly projecting arms interconnecting the upper ends of said upstanding members and extending upwardly and forwardly in an inclined position, members on the outer end of each first arm for engaging and supporting an article, and a second pair of arms pivotally secured to said first pair of arms adjacent the center thereof, members on the free ends of said second pair of arms for engaging and supporting an article when the second pair of arms extends forward and upwardly at an angle greater than the first arms, and a transverse member interconnecting the second pair of arms for engagement with the upper surface of the first pair of arms for maintaining the second pair of arms in diverging relation to the first pair of arms.

8. A convertible cart comprising a wheeled frame having a pair of forward and rear upstanding members with the forward pair of upstanding members terminating above the upper ends of the rear pair of upstanding members, brace means interconnecting the upstanding members and forming a rigid frame, a first pair of arms interconnecting the upper ends of respective forward and rear upstanding members, said arms extending forwardly from the frame and being disposed in upwardly inclined relation for rigidly interconnecting the uneven upper ends of the upstanding members, handle means pivotally attached to said frame, means for limiting the pivotal movement of the handle means, and a second pair of arms terminally pivotally attached to the first pair of arms adjacent the center thereof, said second pair of arms being of a length to project beyond the forward ends of the first pair of arms, a transverse member interconnecting the second pair of arms for engagement with the upper edges of the first pair of arms thereby supporting the second pair of arms in upwardly diverging relation to the first pair of arms.

9. The combination of claim 8 wherein the forward pair of upstanding members is provided with a transverse abutment member, and spring means mounting the abutment member on the upstanding members for resilient engagement of the abutment with an article supported from the arms.

10. The combination of claim 9 wherein a generally L shaped member is supported on the forward ends of said first pair of arms, said L-shaped member including a generally vertical depending leg having the lower terminal end abutting the outer surface of the abutment member, and a downwardly inclined leg engaging over the ends of the first arms.

References Cited in the file of this patent
UNITED STATES PATENTS

| | | |
|---|---|---|
| 726,406 | Colestock | Apr. 28, 1903 |
| 1,382,566 | Strauch | June 21, 1921 |
| 1,828,434 | Odell | Oct. 20, 1931 |

FOREIGN PATENTS

| | | |
|---|---|---|
| 281/26 | Australia | Jan. 26, 1926 |
| 4,876 | Great Britain | Feb. 27, 1912 |